Patented June 20, 1944

2,351,958

UNITED STATES PATENT OFFICE 2,351,958

PRODUCTION OF HARDENABLE ORTHO-CRESOL ALDEHYDE CONDENSATES

Bernhard Habraschka, Hamburg, Germany; vested in the Alien Property Custodian

No Drawing. Application August 1, 1940, Serial No. 349,286. In Germany December 14, 1939

3 Claims. (Cl. 260—19)

This invention relates to a process of producing a hardenable light-colored orthocresol aldehyde condensate.

Orthocresol aldehyde condensates are used only to a limited extent as mixed products with phenol aldehyde resins or urea resins in the manufacture of plastics, chiefly because their labile structure renders them inferior. They begin to set only under difficulties, or not at all, and it is equally difficult to bring about the completion of the setting process owing to the decomposition of the resin molecules. Furthermore, as the solubility of these products is much restricted, it will be understood that the use of orthocresol aldehyde condensates is at present practically nil.

The invention proposes to provide a process for the preparation of an orthocresol condensate which is free from the troubles mentioned and in its applicability is equal to high-grade phenol aldehyde condensates.

The process according to the invention is carried out by condensing o-cresol with an aldehyde in the presence of an ester of phosphoric acid and of a paraffin derivative of the $C_9$-$C_{18}$ group, e. g. their respective fatty acids or the esters thereof. The orthocresol and aldehyde are preferably employed in the proportions of 1 mol of orthocresol and 1½ to 2½ mols of aldehyde. Excellent results were obtained with a mixture of fatty acids as yielded during paraffin oxidation. By repeated fractionating, this mixture may be divided into three portions, each substantially comprising a mixture of fatty acids of the $C_9$-$C_{12}$ series, or of the $C_{12}$-$C_{15}$ series, or of the $C_{16}$-$C_{18}$ series.

The resulting products can serve already as plastic mass for pressing or as raw material for varnishes. Externally, they resemble so-called hard resin and are thermosetting.

It has further been found that these products can be materially improved by condensing and esterifying them with glycerides of oleic acid, preferably of myristic and eleomargaric acids, and an agent combining with the free organic acids, as polyglycols, until the condensate becomes clear. The final product may be used in the form of a solid resin for the manufacture of plastics, etc. or serve in solution for making varnishes.

In its improved form the product can be hardened at lower and higher temperatures.

It was finally found that the product prepared in the manner indicated can be rendered polymerizable by dissolving it in a mixture of aliphatic and aromatic solvents and esters and mixing it with metal soaps, as metallic compounds combined with naphthenic, oleic or resin acids. These metal soaps may be added also after completion of condensation and the products worked in solid form.

According to the invention, high-grade products can be obtained whose properties are equal to those of pure phenol aldehyde condensates. It is possible for instance to prepare products which can be hardened at different temperatures within a range from 100–220° C., depending on use. The final product is soluble in the usual organic solvents and can therefore serve also for making high-grade varnishes, its stability being such that hardening is possible even at particularly high temperatures without decomposition of the resinoid molecule.

The product obtained possesses the following properties and advantages:

Hardening can be effected at temperatures up to 220° C. The hardened final product is highly elastic, can be punched or otherwise mechanically treated, and is indifferent to organic solvents, acids, alkalies and other strongly acting chemicals. In view of its wide range of uses the product is of special importance to electrotechnics, since it is practically unexcelled wth respect to insulating power, electrical properties, small phase angle, heat retaining capacity and elasticity.

As the product can be dissolved by the known aromatic and aliphatic solvents, it can serve also for preserving and insulating all metals and alloys. For example, light metals and their alloys as well as copper, brass, etc. have been advantageously preserved through the application thereof, and it is characteristic in this respect that catalytic action by these metals during hardening could not be observed, whilst known phenol aldehyde condensates are considerably influenced by these metals already during hardening or storing with the result that in most cases the preserving layers became brittle or were knocked off from the metals.

The following examples have been found to give satisfactory results:

Example 1

100 parts o-cresol are mixed with 150 parts formaldehyde (40%) and heated with 2 parts hydrochloric acid and 1 part phosphoric acid, acting as reaction accelerator, to 90–95° C. After about 30 minutes 7 parts sodium hydroxide in diluted solution are added and for about 80–90 minutes heated up to approximately 100° C. Water separated during condensation is removed in the vacuum, whereupon 50 parts tricresyl phosphate and, say, 25–50 parts of one or more fatty acids of the $C_9$–$C_{18}$ series, preferably from paraffin oxidation, are added and heated to 180° C. Until this temperature is reached, a violent reaction is noticeable at certain phases, which subsides, however, after about 30–60 minutes.

The resulting product can be used as plastic for pressing or as raw material for varnish, and is thermosetting.

Example 2

100 parts o-cresol are mixed with 150 parts formaldehyde (40%) and heated with 2 parts hydrochloric acid and 1 part phosphoric acid, acting as reaction accelerator, to 90–95° C. after about 30 minutes 7 parts sodium hydroxide in diluted solution are added and for about 80–90 minutes heated up to approximately 100° C. Water separated during condensation is removed in vacuum, whereupon 50 parts tricresyl phosphate and, say, 25–50 parts of one or more fatty acids of the $C_9$–$C_{18}$ series, preferably such from paraffin oxidation, are added and heated to 180° C. Until this temperature is reached, a violent reaction is noticeable at certain phases, which subsides, however, after about 30–60 minutes.

Then about 100 parts or more glycerides of oleic acid are added, and condensation is continued to about 190° C. After 15–20 minutes at least 5 parts polyglycols are added and also condensed and esterified at the same temperature until the condensate becomes clear.

The final product can be hardened at low and high temperatures and is particularly suited for particularly highly elastic masses. It may serve also as raw material in solid or dissolved form for varnishes.

Example 3

100 parts o-cresol are mixed with 150 parts formaldehyde (40%) and heated with 2 parts hydrochloric acid and 1 part phosphoric acid, acting as reaction accelerator, to 90–95° C. After about 30 minutes 7 parts sodium hydroxide in diluted solution are added and for about 80–90 minutes heated up to approximately 100° C. Water separated during condensation is removed in vacuum, whereupon 50 parts tricresyl phosphate and, say, 25–50 parts of one or more fatty acids of the $C_9$–$C_{18}$ series, preferably such from paraffin oxidation, are added and heated to 180° C. Until this temperature is reached, a violent reaction is noticeable at certain phases, which subsides, however, after about 30–60 minutes.

Then about 100 parts or more glycerides of oleic acid are added, and condensation is continued to about 190° C. After 15–20 minutes at least 5 parts polyglycols are added and also condensed and esterified at the same temperature until the condensate becomes clear.

After completion of the condensation the product is dissolved in a mixture of aliphatic and aromatic solvents and esters and mixed with metal soaps, as metallic compounds combined with naphthenic, oleic or resin acids. It is further possible of course to add these metal soaps after completion of condensation and to work them in solid form.

The final product can serve for plastics or as raw material for varnishes, is thermosetting and at low temperatures (air temperatures) polymerizable owing to catalytic action of the metal soaps.

Condensates prepared according to Examples 1 to 3, depending on their uses, can be mixed with fillers or coloring matter of inorganic or organic nature.

The uses comprise the preparation and utilization of cold and warm hardening varnishes and paints and the function as binding agent for plastics and allied industrial purposes.

The process according to the invention covers of course also the working of o-cresol in mixture with other products to be condensed, as phenol.

I claim:

1. Process for the preparation of a heat hardenable orthocresol-formaldehyde condensate, which comprises preliminarily condensing orthocresol and formaldehyde, in about the proportions of one mol of orthocresol and 1½ to 2½ mols of formaldehyde, to form a preliminary condensation product, and thereafter further condensing said preliminary condensation product in the presence of tricresyl phosphate and a fatty acid having from 9 to 18 carbon atoms in its molecule.

2. Process for the preparation of a heat hardenable orthocresol-formaldehyde condensate, which comprises preliminarily condensing orthocresol and formaldehyde, in about the proportions of one mol of orthocresol and 1½ to 2½ mols of formaldehyde, to form a preliminary condensation product, and thereafter further condensing said preliminary condensation product in the presence of tricresyl phosphate and a fatty acid having from 9 to 18 carbon atoms, such acid being produced by paraffin oxidation.

3. Process for the preparation of a heat hardenable orthocresol-formaldehyde condensate, which comprises preliminarily condensing orthocresol and formaldehyde, in about the proportions of one mol of orthocresol and 1½ to 2½ mols of formaldehyde, to form a preliminary condensation product, thereafter further condensing said preliminary condensation product in the presence of tricresyl phosphate and a fatty acid having from 9 to 18 carbon atoms in its molecule and derived from paraffin oxidation, further condensing the resulting condensation product in the presence of a glyceride of an acid selected from the group consisting of oleic, myristic and eleomargaric acids, and thereafter further condensing and esterifying with a polyglycol.

BERNHARD HABRASCHKA.